United States Patent

Schienbein et al.

(10) Patent No.: US 6,738,692 B2
(45) Date of Patent: May 18, 2004

(54) MODULAR, INTEGRATED POWER CONVERSION AND ENERGY MANAGEMENT SYSTEM

(75) Inventors: Lawrence A. Schienbein, Kennewick, WA (US); Donald J. Hammerstrom, W. Richland, WA (US); Gerald W. Droppo, Richland, WA (US); Brent Earle Harris, Calgary (CA)

(73) Assignee: Sustainable Energy Technologies, Alberta (CA)

( * ) Notice: Subject to any disclaimer, the term of this patent is extended or adjusted under 35 U.S.C. 154(b) by 0 days.

(21) Appl. No.: 10/179,472

(22) Filed: Jun. 24, 2002

(65) Prior Publication Data

US 2003/0036806 A1 Feb. 20, 2003

Related U.S. Application Data

(60) Provisional application No. 60/300,895, filed on Jun. 25, 2001.

(51) Int. Cl.[7] .............................. H02J 3/00; H02B 1/20
(52) U.S. Cl. ..................... 700/286; 361/614; 361/648
(58) Field of Search ................................ 700/286, 287, 700/295; 361/614, 648; 702/60–62; 307/104

(56) References Cited

U.S. PATENT DOCUMENTS

| | | |
|---|---|---|
| 3,491,282 A | 1/1970 | Heinrich et al. |
| 3,628,123 A | 12/1971 | Rosa et al. |
| 3,648,149 A | 3/1972 | Brown et al. |
| 3,792,286 A | 2/1974 | Meier |

(List continued on next page.)

FOREIGN PATENT DOCUMENTS

| | | |
|---|---|---|
| DE | 196 26 447 A | 3/1998 |
| DE | 196 35 606 A | 5/1998 |

(List continued on next page.)

OTHER PUBLICATIONS

Claudio Manoel da Cunha Duarte and Ivo Barbi, "A New Family of ZVS–PWM Active–Clamping DC–to–DC Boost Converters: Analysis, Design, and Experimentation," IEEE Transactions On Power Electronics, vol. 12, No. 5, Sep. 1997, pp. 824–831.

(List continued on next page.)

*Primary Examiner*—Leo Picard
*Assistant Examiner*—Douglas S. Lee
(74) *Attorney, Agent, or Firm*—Marger Johnson & McCollom, P.C.

(57) ABSTRACT

A power conversion and energy management system preferably includes a controller, one or more standard modules, and a custom (or semi-custom) backplane. The backplane preferably accommodates one or more modules and uses the modules to control power quality and/or flow to one or more input and/or output connections. The standard modules are preferably power modules such as an inverter module, converter module, or grid connect module. In addition to accommodating the modules, the backplane can include system components other than power electronics. The backplane can, for example, include external connectors, disconnects, fusing, and so forth, for a given application. The backplane can further include internal DC and AC buses to interconnect the modules. The backplane can also include a communications module, a user interface, a socket for control firmware, and slots for accommodating the standard modules.

18 Claims, 5 Drawing Sheets

U.S. PATENT DOCUMENTS

| | | | |
|---|---|---|---|
| 4,032,832 A | | 6/1977 | Miller |
| 4,366,532 A | | 12/1982 | Rosa et al. |
| 4,628,438 A | | 12/1986 | Montague |
| 4,800,481 A | | 1/1989 | Knaffl et al. |
| 5,041,957 A | | 8/1991 | Dhyanchand et al. |
| 5,132,892 A | | 7/1992 | Mizoguchi |
| 5,229,652 A | * | 7/1993 | Hough .................. 307/104 |
| 5,373,433 A | | 12/1994 | Thomas |
| 5,631,820 A | | 5/1997 | Donnelly et al. |
| 5,896,281 A | | 4/1999 | Bingley |
| 5,933,339 A | | 8/1999 | Duba et al. |
| 6,096,449 A | | 8/2000 | Funglevand et al. |
| 6,184,593 B1 | | 2/2001 | Jungreis |
| 6,188,199 B1 | | 2/2001 | Beutler et al. |
| 6,243,277 B1 | | 6/2001 | Sun et al. |
| 6,255,008 B1 | | 7/2001 | Iwase |
| 6,377,874 B1 | * | 4/2002 | Ykema .................. 700/286 |
| 6,522,955 B1 | * | 2/2003 | Colborn ................. 700/286 |

FOREIGN PATENT DOCUMENTS

| | | |
|---|---|---|
| EP | 0756372 A1 | 1/1997 |
| EP | 0780750 A2 | 6/1998 |
| EP | 0 913 918 A | 6/1999 |
| EP | 2001037101 | 9/2001 |
| JP | 0 390 184 A | 3/1990 |
| JP | 10 014133 A | 1/1998 |
| JP | 0 874 448 A | 10/1998 |
| WO | WO 99/41828 | 8/1999 |

OTHER PUBLICATIONS

H. Weiss, "Control System of the Static System–Tie Frequency Converter Muldenstein Including Operation Results," EPE 95, Sep. 19, 1995. pp. 185–195, XP000537742 Sevilla.

A. M. A. Mahmoud, H. M. Mashaly, S. A. Kandil, H. El Khashab, M. N. F. Nashed, "Fuzzy Logic Implementation for Photovoltaic Maximum Power Tracking," IEEE 2000, pp. 735–740.

Tarun Gupta, R. R. Boudreaux, R. M. Nelms and John Y. Hung, "Implementation of a Fuzzy Controller for DC–DC Converters Using an Inexpensive 8–b Microcontroller," 1997 IEEE, pp. 661–668.

Suttichai Premrudeepreechacharn and Tongrak Poapornsawan, "Fuzzy Logic Control of Predictive Current Control for Grid–Connected Single Phase Inverter," IEEE 2000, pp. 1715–1718.

Bor—Ren Lin, "Analysis of Fuzzy Control Method Applied to DC–DC Converter Control," IEEE 1993, pp. 22–28.

W. C. So, C. K. Tse and Y.S. Lee,"A Fuzzy Controller for DC–DC Converters," IEEE 1994, pp. 315–320.

* cited by examiner

MODULAR, INTEGRATED POWER CONVERSION AND ENERGY MANAGEMENT SYSTEM

This application claims priority from U.S. Provisional Patent Application Serial No. 60/300,895, filed Jun. 25, 2001, the contents of which are incorporated herein by reference in their entirety.

BACKGROUND OF THE INVENTION

1. Field of the Invention

This invention relates generally to power conversion and energy management systems for Distributed Energy Resources (DER). This invention further relates to electrical power conditioning, controlling, and/or metering devices, including, but not limited to, UPS systems, remote power systems, backup power systems, harmonic filters, and voltage or frequency regulators or adapters.

2. Description of Related Art

Broadly speaking, DER includes all power generators and energy storage systems other than medium and large-scale conventional power plants. Medium and large-scale power plants include, for instance, coal fired steam turbine generators and hydroelectric generators that are rated at hundreds of megawatts up to thousands of megawatts. The fundamental and distinguishing feature of DER power systems is that they can be largely or completely factory manufactured, assembled, and tested. They can also be easily commissioned, shipped, and installed as complete modules. Hence, they can go into service very quickly, where and when needed. Lead times are very short compared to those required to bring a large-scale power plant on-line.

Stated another way, DER or Distributed Generation (DG), includes the use of small generators (typically ranging in capacity from 1 to 10,000 kW), scattered throughout a power system, to provide the electric power needed by electrical consumers. DG typically includes all uses of small electric power generators, whether located on the utility system, at the site of a utility customer, or at an isolated site that is not connected to the power grid.

Dispersed generation is a subset of distributed generation, which refers to generation that is located at customer facilities off the utility system. Dispersed generation is also typically understood to include only very small generation units, of the size needed to serve individual households or small businesses, in the capacity range of 10 to 250 kW.

Most types of distributed generators utilize traditional power generation paradigms—e.g., diesel, combustion turbine, combined cycle turbine, low-head hydro, or other rotating machinery. DG also, however, includes the use of fuel cells and renewable power generation methods such as wind, solar, or low-head hydro generation. These types of renewable generators are included in DG because their small size makes them very convenient to connect to the lower voltage (distribution) parts of the electric utility grid.

SUMMARY OF THE INVENTION

According to one embodiment of the present invention, a modular, integrated Power Conversion and Energy Management System preferably includes a plurality of independent power module(s) integrated together with communication module(s) and a configurable controller.

In a preferred embodiment of the invention, for example, an integrated Power Conversion and Energy Management System includes an integrated controller, one or more standard modules, and a custom (or semi-custom) backplane. The integrated controller preferably accommodates one or more power or communication modules and uses those modules to control power quality and/or flow to one or more input and/or output connections. The integrated controller preferably includes controller software, control circuits, power circuits, protection circuits, external electrical connections, an interface with one or more integrated or modular communications module, and an interface with one or more power modules.

The standard modules are preferably power modules. Each power module can include power circuits and a driver circuit, if necessary, to receive control signals from an external source. Each module also preferably includes a memory that can be polled by the backplane to identify the module and provide "plug-and-work" functionality. In other words, the memory can pass all of the module's design parameters to the controller on the backplane, thereby informing the controller how best to operate it.

For each application, a custom (or semi-custom) backplane can be developed to accomodate the standard modules. The backplane preferably includes everything but the power electronics. The backplane can, for example, include the external connectors, disconnects, fusing, and so forth, that are required for the application. The backplane can further include the various internal DC and AC buses that are required to interconnect the modules. The backplane also preferably includes the communications module, a user interface, a supervisory controller, a socket for control firmware, and an appropriate number of slots for accommodating the standard modules. For semi-custom backplanes, the control firmware preferably provides the full customization for each application.

BRIEF DESCRIPTION OF THE DRAWINGS

The foregoing objects, features, and advantages of the present invention will become more readily apparent from the following detailed description of preferred embodiments, made with reference to the following figures, in which.

DETAILED DESCRIPTION

Figure 1:
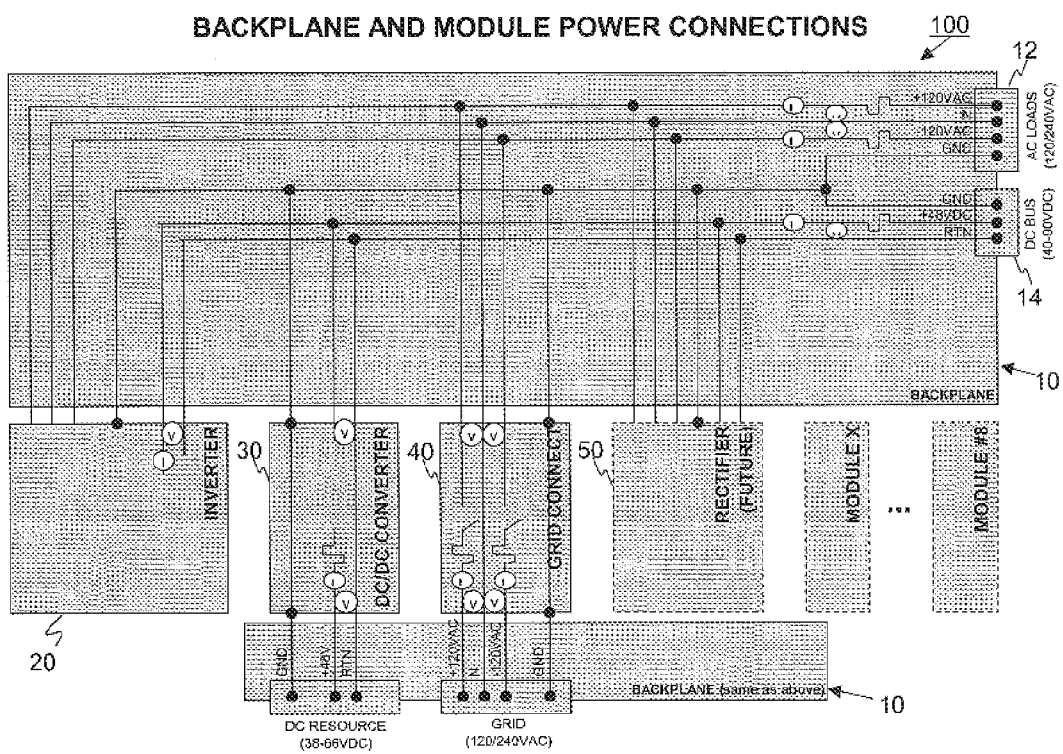
FIG. 1 is a block diagram illustrating power connections of a power conversion and energy management system according to a preferred embodiment of the present invention.

In general, a modular, integrated Power Conversion and Energy Management System according to a preferred embodiment of this invention preferably includes an independent power module(s) integrated together with a communication module(s) and a configurable controller. The controller is preferably provided to accommodate the modules and use them to control power quality and/or flow to one or more input and/or output connections. The controller can include controller software, control circuits, power circuits, protection circuits, external electrical connections, an interface with one or more integrated or modular communications module, and an interface with one or more power modules.

Standard modules, such as power modules, are also preferably included. Each power module preferably includes power circuits and, if necessary, a driver circuit. The driver circuit receives control signals from an external source. A memory is also preferably provided in each of the standard modules to convey information to the backplane to identify the module and provide "plug-and-work" functionality. More particularly, when polled by the backplane, the memory can pass the module's design parameters to the controller, thereby informing the controller how best to operate it.

The flexibility of the inverter and DC/DC converter modules according to this invention allows them to be manufactured in high volume and used for different applications simply by altering the supervisory control software and/or designing a new backplane. In addition, the universality of the modules that is provided by hybrid ("Pulsed Step") switching permits larger manufacturing volumes by pooling different applications, resulting in lower manufacturing costs. Using the simple design facilitated by Pulsed Step switching, multiple inputs allow the inverters to have a lower component count resulting in lower costs, higher efficiency, and higher reliability.

The following tables provide sample specifications for standard modules. These sample specifications illustrate certain functional aspects of the standard modules. It should be noted, however, that the principles of this invention apply to any power or voltage rating, and that the power ratings and voltages outlined below have been selected for illustrative purposes only.

TABLE 1

2 kVA Pulsed Step Inverter

| Value | Specification | Influencing Factors |
|---|---|---|
| 2 kVA | Power Rating | Rating selected to meet needs of DG apps. |
| 150 V | Max DC Input | Determined by maximum rating of all circuit components. Possibly defined by electrical code. |
| 125 V | Max DC operating Voltage | Determined by transformer winding ratio and switching algorithms. |
| 105 V | DC Voltage sweet spot | Point of highest efficiency on the inverter curve measured at full load. Determined by the transformer winding ratio. |
| 70 V | Min DC operating voltage | Determined by the transformer winding ratio and switching algorithms. |

TABLE 2

1 kVA Pulsed Step Inverter Leg

| Value | Specification | Influencing Factors |
|---|---|---|
| 1 kVA | Power Rating | Rating selected to meet needs of DG apps. |
| 30 V | Nominal AC Output Voltage | Determined by voltage ratio. Also determines how many steps must be assembled to make up a full inverter. |
| 150 V | Max DC Input | Determined by maximum rating of all circuit components. Possibly defined by electrical code. |
| 125 V | Max DC operating Voltage | Determined by transformer winding ratio and switching algorithms. |
| 105 V | DC Voltage sweet spot | Point of highest efficiency on the inverter curve measured at full load. Determined by the transformer winding ratio. |
| 70 V | Min DC operating voltage | Determined by the transformer winding ratio and switching algorithms. |

As indicated, the last three values in each of Tables 1 and 2 are linked by the winding ratio. A compromise should therefore be reached when selecting the winding ratio. Alternatively, the transformers in a module may be swappable to allow changing these operating characteristics even within a semi-standard module.

TABLE 3

2 kW DC-DC Converter

| Value | Specification | Influencing Factors |
|---|---|---|
| 2 kW | Power Rating | Rating selected to meet needs of DG apps. |
| 150 V | Max DC Input (left and right) | Determined by voltage ratio. Also determines how many steps must be assembled to make up a full inverter. |
| 125 V | Max DC Operating Voltage (left and right) | Determined by switching algorithms. Same as Max DC input. |
| 0 V | Min DC Operating voltage | May be zero or have a non-zero lower limit. |

A custom (or semi-custom) backplane can be developed for each specific application to accomodate the standard modules. The backplane can, for example, include the external connectors, disconnects, fusing, and so forth, that are required for the application. The backplane can further include the various internal DC and AC buses that are required to interconnect the modules. The backplane also preferably includes the communications module, the user interface, the supervisory controller, a socket for control firmware, and an appropriate number of slots for accommodating the standard modules. For semi-custom backplanes, the control firmware preferably provides the full customization for each application.

Some applications for this invention include Integrated Fuel Cell Power Conversion and Energy Management Systems, Photovoltaic Power Conversion and Energy Management Systems, Universal Residential/Small Commercial breaker panels for Distributed Generation, DC/DC Battery Scaler Applications, UPS applications, Off grid Photovoltaic Systems, Large Stand-Alone Hybrid Systems, Building Integrated Photovoltaic Power Conversion and Energy Management Systems, and many more.

In a Fuel Cell Power Conversion and Energy Management System, for example, the backplane can be integrated with the fuel cell system. The entire fuel cell system could be called the backplane. In a Photovoltaic Power Conversion and Energy Management System, the backplane could, for example, be a wall or floor mounted enclosure that may or may not also include batteries.

In a Universal Residential/Small Commercial breaker panel for Distributed Generation, the backplane is preferably integrated with the breaker panel and provides for the connection of any distributed generation resource or storage technology with the right modules and firmware. The DC/DC Battery Scaler Application preferably uses a DC/DC converter to make a 125 V battery appear as a 48 V battery, for example. The backplane preferably includes the correct number of slots for Standard DC/DC converter modules and a communications module. UPS applications and off-grid Photovoltaic Systems are also possible.

A Large Stand-Alone Hybrid System can either include a large number of smaller modules, or, if warranted, larger sized modules. A Building-Integrated Photovoltaic Power Conversion and Energy Management System could be accommodated by using several of the Photovoltaic Power Conversion and Energy Management Systems described above, or by making the building become the backplane, with a single central controller for all of the modules.

Where the building serves as the backplane, several distributed inverters can be positioned around the building and act similar to parallel harmonic filters. Each inverter produces the power it needs to, but alters the waveform to produce a wave tailored to correct the power quality problems present on the line at any given time. These inverters do not need to be capable of producing a complete sine wave independently, as long as there are a sufficient number of them in the building. Furthermore, no central control of the inverters is necessary, as each is capable of independently assessing the quality of power on the line and determining the proper switching algorithm for controlling the power quality.

Backplane and Module Power Connections

FIG. 1 is a block diagram of a power conversion and energy management system 100 according to a preferred embodiment of the present invention. FIG. 1 further illustrates the power connections between the backplane 10 and the modules 20, 30, 40, 50. FIGS. 2–5 illustrate the digital and analog signals shared between the modules 20, 30, 40, 50 and the backplane 10.

Referring to FIG. 1, a backplane 10 preferably operates using six power signals, including three AC power signals (+120 VAC, N, −120 VAC), two DC power signals (+48 VDC, RTN), and a shared ground signal (GND). Fused 120 VAC and 240 VAC system load connectors 12 are available from the backplane AC power signals to serve system AC loads up to 10 kW. A fused DC plug connector 14 makes the DC component of the backplane 10 available to either DC sources or loads in the range of 40–90 VDC. The external DC plug connector 14 can, for example, serve a fuel cell. Metering is shown for currents and voltages at both the AC and DC system connectors 12, 14.

The AC power signals include a +120 VAC signal, a −120 VAC signal, and a neutral return wire (N) for 120 VAC or 240 VAC loads. The +120 VAC and −120 VAC signals provide the legs of a 240 VAC system. As noted previously, a system case ground (GND) is also provided. The DC Power Signals include a +48 VDC positive terminal of a DC bus and a DC bus return conductor (RTN). The DC signals also include the common ground signal (GND). The DC bus voltage ranges between 40–90 VDC.

Up to eight power modules can be plugged into the power signals of the 10 kW backplane 10 of this embodiment. This module set can, for example, include a combination of one 10 kW grid connect module, up to four 2.5 kW inverter modules, and up to four 2.5 kW converter modules. In one embodiment, up to four 2.5 kW rectifier modules could also be included.

In the embodiment shown in FIG. 1, the modules include an inverter module 20, a DC/DC converter module 30, a grid connect module 40, and a rectifier module 50. As indicated, up to four other modules could also be included. The inverter power module 20 is preferably a 2.5 kW inverter module that exchanges power between the AC and DC buses 12, 14 of the backplane 10. The converter power module 30 is preferably a 2.5 kW converter module that exchanges power between the DC power bus 14 of the backplane 10 and an external DC resource or load.

In a preferred configuration, the external DC source or load is a 48 VDC battery bank. In this preferred configuration, the DC signals in the converter module 30 include a DC resource or load voltage in the range of 38–66 VDC (+48 VDC) and a DC return node (RTN) common to the backplane DC bus 14. The signals also include the system case ground (GND). These signals are delivered through the backplane 10.

The 10 kW grid connect module 40 decides when the system 100 should be grid connected, as well as when it is safe and proper to do so. The grid is connected to the backplane AC power bus 12 through fuses. The 2.5 kW rectifier module 50 provides controlled current rectification of power from the backplane AC bus 12 to the backplane DC bus 14.

Inverter Digital and Analog Signals

Figure 2:
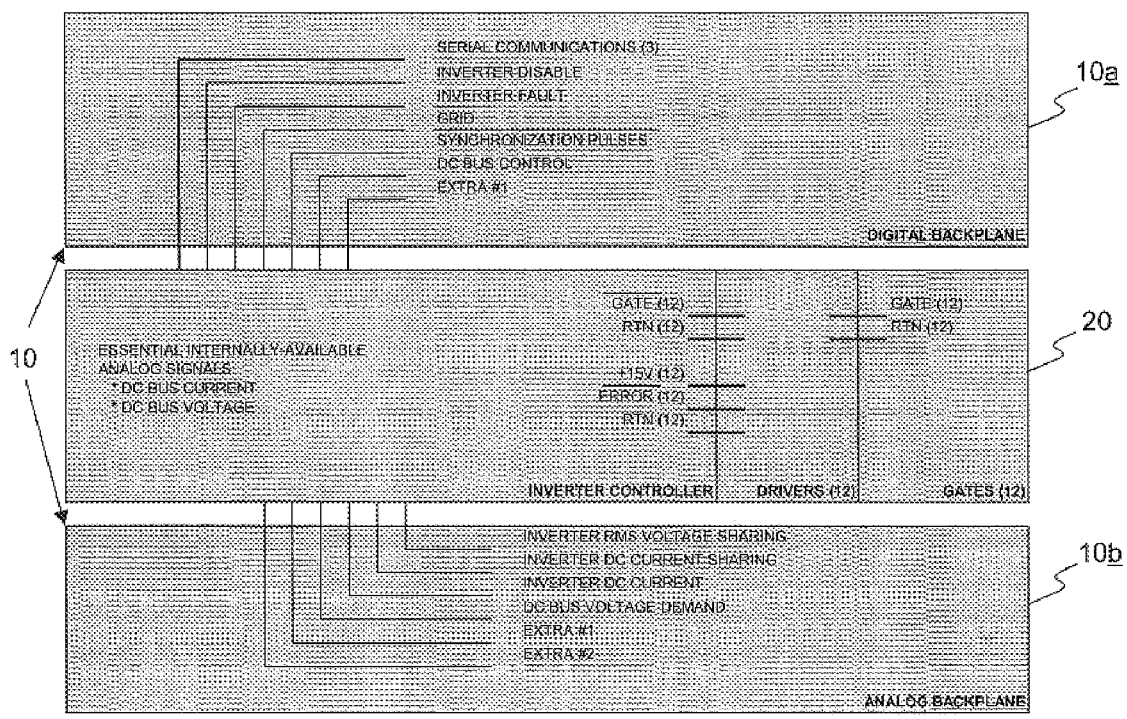
FIG. 2 is a block diagram illustrating digital and analog signals between an inverter module and a backplane of the power conversion and energy management system of FIG. 1.

FIG. 2 is a block diagram showing digital and analog signals that the inverter 20 shares externally through the system's backplane 10. Although preferably configured as a single unit, the backplane 10 is represented here in two functional blocks, including a digital backplane 10a and an analog backplane 10b. The system power connections have been described previously and are therefore not reproduced in FIG. 2.

Referring to FIGS. 1 and 2, the control objective for an inverter module 20 in a stand-alone system is for the inverter module 20 to maintain a constant, flicker-free, high-quality 120/240 VAC output at 60.5 Hz. The system load determines both the power factor of the system and the amount of power transferred to the AC bus of the backplane 10. The control objective for an inverter module 20 in a grid-connected system is for the inverter module 20 to remain synchronized to the power grid and maintain a unity power factor at a grid interface.

The amount of power exchanged with the power grid is determined by one of several possible strategies. The preferred default strategies are to either maintain the backplane DC bus voltage at 48 VDC or follow some system imposed DC bus voltage. Another strategy, however, is to follow a current transfer demand signal imposed by the analog backplane 10b. The selection of one of these two strategies can be made using a DC BUS CONTROL signal, which is preferably set by jumper control on the digital backplane 10a. The jumper control, however, may be overridden by software. Either system inverters or system converters should control the backplane DC bus voltage. If inverters are not controlling the DC bus, then they are free to follow demand signals.

The shared digital signals include a SERIAL COMMUNICATIONS signal, an /INVERTER FAULT signal, a /GRID signal, /SYNCHRONIZATION PULSES, an /INVERTER DISABLE signal, and a DC BUS CONTROL signal. The SERIAL COMMUNICATIONS signal preferably provides three-wire, full duplex serial communications at 9600 baud, for example. The standard modules are preferably addressed and recognized by their module port, which is communicated over shared serial communications lines. Detailed status information can be shared through serial communications.

The /INVERTER FAULT signal is preferably pulled low by the inverter to indicate a faulted inverter condition. This signal can also be pulled low and held low by the digital backplane 10a to declare a faulted system. The /GRID signal is pulled and held low by the grid connect module 40 to indicate that the grid is connected to the backplane AC bus 12.

The /SYNCHRONIZATION PULSES are low-going pulses maintained by the digital backplane 10a. In a stand-alone mode, the frequency of these pulses is preferably maintained at 60.5 Hz. In grid-connected mode, however, these pulses are preferably synchronized to the positive-going grid voltage zero crossings between the backplane 10 and the grid connect module 40.

The /INVERTER DISABLE signal can be pulled low by the inverter to indicate that it is not yet ready to invert. This signal can also be pulled low by the digital backplane 10a to immediately disable the inverter. The DC BUS CONTROL signal is received by the inverter 20 from the digital backplane 10a. A low-level DC BUS CONTROL signal tells the system inverters to maintain the backplane DC voltage. A high-level DC BUS CONTROL signal tells the system inverters to control the backplane DC voltage.

The shared analog signals include an INVERTER RMS VOLTAGE SHARING (and DEMAND) signal, an INVERTER DC CURRENT SHARING signal, an INVERTER DC CURRENT DEMAND signal, and A DC BUS VOLTAGE DEMAND signal. In stand-alone mode, the INVERTER RMS VOLTAGE SHARING (and DEMAND) signal unifies AC voltages asserted by multiple inverter modules. In grid-connected mode, this signal assures that each inverter module shares equally in VAR generation. Each inverter module asserts a high-impedance voltage proportional to the AC voltage it is trying to generate, and the current exchanged through this connection indicates that such AC voltage should be increased or decreased to match that of neighboring inverters.

The grid connect module 40 matches AC voltages prior to performing grid connection, and controls VARs during grid-connected mode by itself imposing a low-impedance voltage on the INVERTER RMS VOLTAGE SHARING (AND DEMAND) signal line. By default, an intermediate-impedance signal is always present here to pull all inverters toward 120/240 VAC output during stand-alone operation. The analog backplane 10b handles any feedback control of output AC voltage to be handled by this signal during stand-alone mode.

The INVERTER DC CURRENT SHARING signal performs a similar function to that of the INVERTER VOLTAGE SHARING signal, assuring equal sharing of current and power (rather than voltage) in both grid-connected and stand-alone modes. The analog backplane 10b asserts a 0–20 mA signal on the INVERTER DC CURRENT DEMAND signal line to control current exchange during grid-connected mode. This demand signal is followed if the inverter DC BUS CONTROL signal is set HIGH during grid-connected operation. This signal is ignored during stand-alone mode.

If present, the DC BUS VOLTAGE DEMAND signal from the analog backplane 10b overrides the default value of +48 VDC imposed by each of the inverter and converter modules 20, 30. During grid-connected operation, while the DC BUS CONTROL signal is set LOW, the inverter 20 controls the backplane DC bus 14 to follow this signal. The INVERTER CURRENT SHARING and INVERTER VOLTAGE SHARING signals force any parallel inverters to share this responsibility.

Converter Module Digital and Analog Signals

Figure 3:
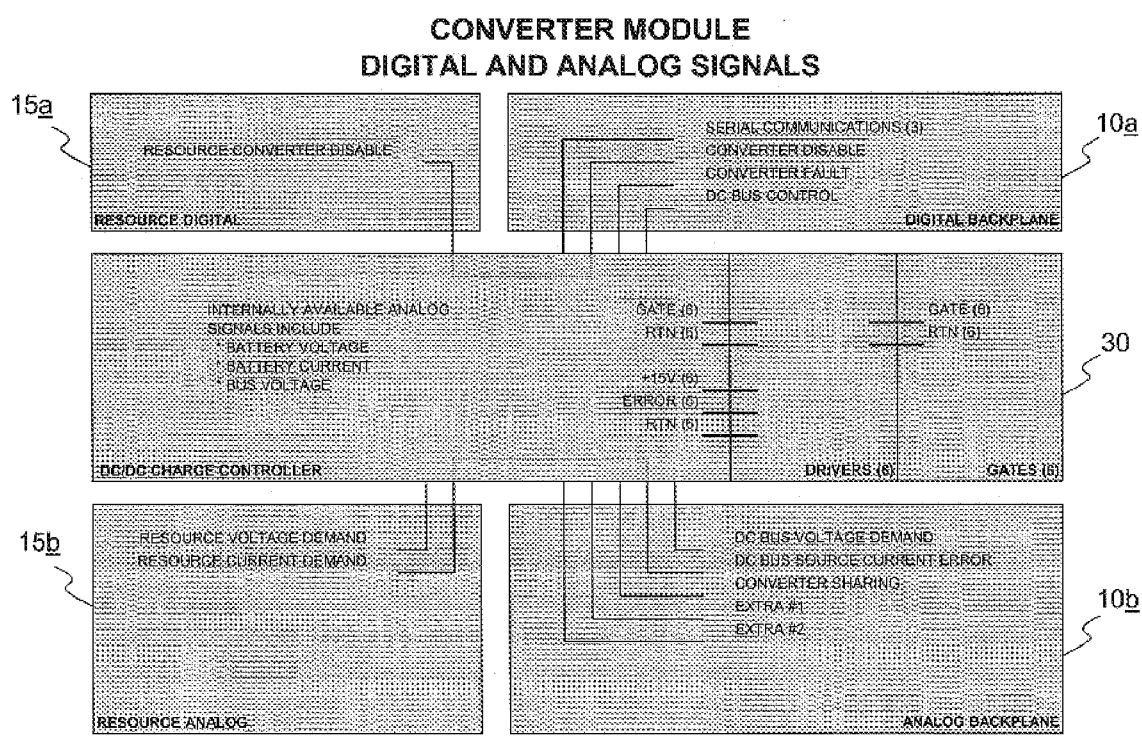
FIG. 3 is a block diagram illustrating digital and analog signals between a converter module and a backplane of the power conversion and energy management system of FIG. 1.

FIG. 3 is a block diagram illustrating the digital and analog signals between the converter 30 and the digital and analog backplane 10a, 10b components of the system backplane 10. Referring to FIGS. 1 and 3, the choice of control objective depends both on whether the system 100 is grid-connected and also on whether batteries support the backplane's DC bus 14.

Without battery support of the DC bus (parallel topology) 14, the control objective is for the converter 30 to maintain the voltage on the backplane's DC bus 14 during stand-alone mode. The DC bus voltage is preferably regulated to +48 VDC. When present, however, the backplane's DC BUS VOLTAGE DEMAND signal can override this default. This configuration is referred to as a "parallel" configuration because the principal renewable energy source bypasses, or parallels, the converters.

If the backplane's DC bus potential is supported by a battery or by another inverter (or rectifier) module, each converter is free to service its own energy resource. The objective in this circumstance is to optimize the capabilities of the energy resource without overcharging or otherwise damaging any batteries on the backplane's DC bus 14. The converter 30 should therefore control its input voltages and currents while monitoring the backplane's DC bus voltage.

Where the converter 30 is servicing a renewable energy resource like a fuel cell or PV array, the converter 30 may follow a resource current demand signal. Where the converter module 30 is servicing a battery, however, the converter 30 can be directed to charge the battery and maintain its float charge. The digital backplane 10a should be able to tell as part of its startup initialization whether the DC bus 14 is supported by a battery and thereafter select the converters' control objective through the DC BUS CONTROL signal.

The shared digital signals on the system side include SERIAL COMMUNICATIONS signals, a /CONVERTER DISABLE signal, a /CONVERTER FAULT signal, and a DC BUS CONTROL signal. The SERIAL COMMUNICATIONS signals provide three-wire, full duplex serial communications at 9600 baud. Modules are addressed by and recognized by their module port, which is communicated over shared serial communications lines. Detailed status information can be shared through serial communications.

The /CONVERTER DISABLE signal is pulled low by the converter 30 to indicate that it is not ready to convert. This signal can also be pulled low by the digital backplane 10a to immediately disable the converter 30. The /CONVERTER FAULT signal is pulled low by the converter 30 to indicate a faulted inverter condition. This signal can also be pulled low and held low by the digital backplane 10a to declare a faulted system.

The DC BUS CONTROL signal is also received from the digital backplane 10a. A low-level DC BUS CONTROL signal tells the system inverters 20 to maintain the backplane DC voltage. A high-level DC BUS CONTROL signal turns control of the backplane DC voltage over to the system converters 30. The shared digital signal on a resource side 15a is the /RESOURCE CONVERTER DISABLE signal. This signal is pulled low by the converter 30 to indicate that it is not ready to convert. It can also be pulled low by a resource manager, if any, to immediately disable the converter 30.

The shared analog signals on the system side include a DC BUS VOLTAGE DEMAND signal, a DC BUS SOURCE CURRENT ERROR signal, and a CONVERTER CURRENT SHARING signal. When the DC BUS CONTROL signal is HIGH, each converter 30 must try to maintain the backplane's DC bus potential using the DC BUS VOLTAGE DEMAND signal from the analog backplane 10b. If a low-impedance voltage signal is asserted by the backplane on this signal line, the converter 30 tries to control the backplane voltage to follow this signal. Otherwise, 48 VDC is maintained on the backplane's DC bus by a high-impedance default signal asserted by each converter on this signal line. This signal is ignored when the DC BUS CONTROL signal is LOW.

The DC BUS SOURCE CURRENT ERROR signal is a −50 to 50 mA signal asserted by the analog backplane 10b to represent a current error caused by a DC resource that is connected directly to the backplane's DC bus 14 in the "parallel" configuration. The converter 30 preferably adjusts its power transfer to correct this current error. This signal is ignored when the DC BUS CONTROL signal is high. The resource side demand signals always take precedence over this demand signal.

Each of the converters being used in parallel asserts a high-impedance voltage on the CONVERTER CURRENT SHARING signal line. The current transferred over this line helps each converter 30 adjust its current to share load. This is accomplished, for instance, by insisting that adjacent converters are connected in parallel to each other. Demand signals then need only be presented to one of the parallel converters. The CONVERTER CURRENT SHARING signal does not depend on the state of DC BUS CONTROL signal.

The shared analog signals on the analog resource side 15b include a RESOURCE CURRENT DEMAND signal, and a RESOURCE VOLTAGE DEMAND signal. The RESOURCE CURRENT DEMAND signal is a −50 to 50 mA analog input signal from the resource that demands a corresponding resource-side current. This signal is ignored when the DC BUS CONTROL signal is high. This signal further takes precedence over any DC BUS SOURCE CURRENT ERROR signal.

The RESOURCE VOLTAGE DEMAND signal is a voltage signal from the resource that demands a given resource voltage. This signal is ignored when the DC BUS CONTROL signal is high. This signal also takes precedence over any DC BUS SOURCE CURRENT ERROR signal. This signal can be used to control "series" configuration peak power tracking or battery float charging.

Grid Connect Module Digital and Analog Signals

Figure 4:
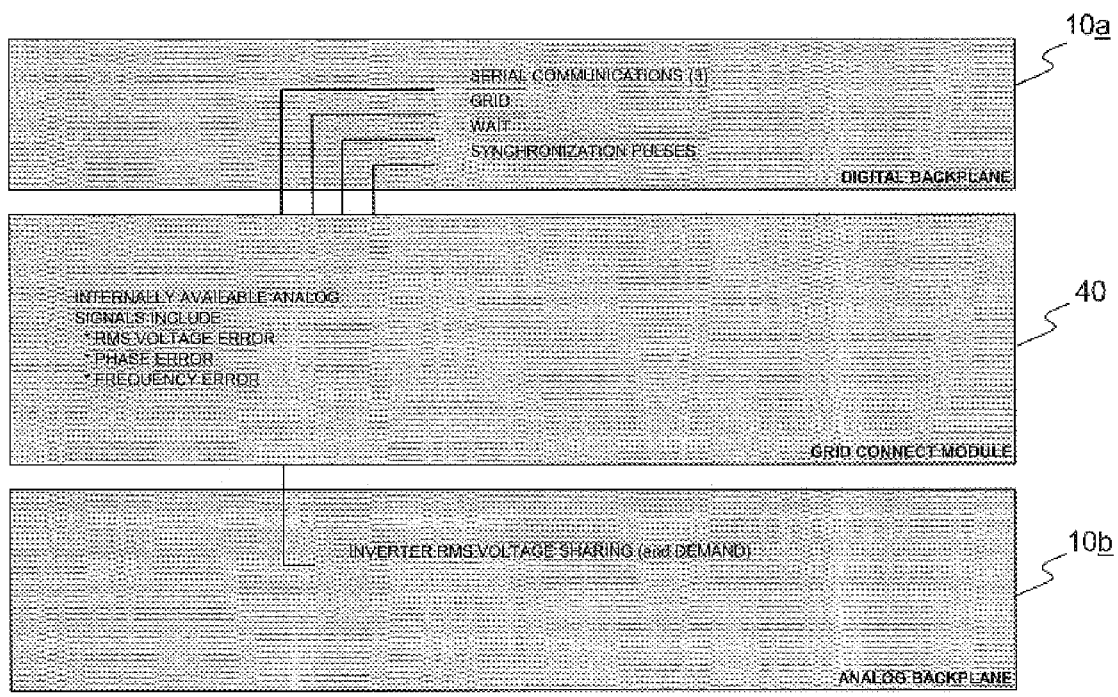
FIG. 4 is a block diagram illustrating digital and analog signals between a grid connect module and a backplane of the power conversion and energy management system of FIG. 1.

FIG. 4 is a block diagram of the grid connect module 40 and illustrates the digital and analog signals that the grid connect module 40 shares externally through the digital and analog backplane components 10a, 10b of the system backplane 10. The control objectives for the grid connect module 40 will now be described in detail with reference to FIGS. 1 and 4.

In a stand-alone system, prior to connecting to the grid, the grid connect module 40 preferably measures, compares, and corrects the system and grid RMS voltages so that they are within accepted tolerances. This module 40 also preferably seamlessly adjusts the default 60.5 Hz pulse frequency maintained by the backplane 10 to synchronize it in both phase and frequency with the zero crossings of the grid voltage waveform. The grid connect module 40 completes the grid connection and signals the system that it is now in grid-connected mode only after the backplane 10 releases a signal to indicate that the system 100 is ready for grid connection.

While the grid is connected to the backplane's AC bus 12 through the grid connect module 40, this module 40 corrects a power factor at the system's grid connect point by modifying an analog DEMAND signal. The grid-connect module also continues to hold the backplane's pulse train in perfect synchronization with the zero crossings of the grid's voltage waveform. In addition, this module 40 preferably calculates frequency and analog voltages, currents, and power transfers that are available to it at its terminals and communicates its status (as well as any additional easily calculated analog values that are available to it via serial communications) to the backplane processor 18 (see FIG. 5).

In grid-connected mode, the grid connect module 40 is further preferably configured to immediately recognize a serial or one-line digital alert signal from the backplane 10 requesting disconnection. It also measures frequency and voltage variations that indicate a loss of grid integrity, which may result in a drift toward the 60.5 Hz default frequency. The grid module 40 further quickly disconnects the system from the grid upon request or when abnormal conditions are identified.

The shared digital signals of the grid connect module 40 include SERIAL COMMUNICATIONS signals, a /GRID signal, a /WAIT signal, and /SYNCHRONIZATION PULSES. As with the other modules, the SERIAL COMMUNICATIONS signals preferably provide three-wire, full duplex serial communications at 9600 baud, for example. Also, the modules can be addressed and recognized by their module port communicated over shared serial communications lines. Detailed status information can be shared through the serial communications channel.

The /GRID signal is pulled and held low by the grid connect module 40 to indicate that the grid is connected to the backplane AC bus 12. The /WAIT signal is held low by the grid connect module 40 to indicate that the system and the grid are not ready to be connected. The /WAIT signal can also be held low by the digital backplane 10a to indicate that a system component is not prepared for grid connection.

The /SYNCHRONIZATION PULSES are low-going pulses maintained by digital backplane 10a. In stand-alone mode, the frequency of these pulses is preferably maintained at 60.5 Hz. In grid-connected mode, however, these pulses are preferably synchronized to the positive-going grid voltage zero crossings between the backplane 10 and the grid connect module 40.

The shared analog signal is an INVERTER RMS VOLTAGE SHARING (and DEMAND) signal. In stand-alone mode, the INVERTER RMS VOLTAGE SHARING (and DEMAND) signal unifies AC voltages asserted by multiple inverter modules. In grid-connected mode, this signal assures that each inverter module 20 shares equally in VAR generation. Each inverter module 20 asserts a high-impedance voltage proportional to the AC voltage it is trying to generate, and the current exchanged through this connection indicates that such AC voltage should be increased or decreased to match that of neighboring inverters. The grid-connect module 40 matches AC voltages prior to performing grid connection and controls VARs during grid-connected mode by itself imposing a low-impedance voltage on this signal line. By default, an intermediate-impedance signal is preferably always present to pull the inverters toward 120/240 VAC output during stand-alone operation. The analog backplane 10b handles feedback control of output AC voltage for this signal during stand-alone mode.

Backplane Digital and Analog Signals

Figure 5:
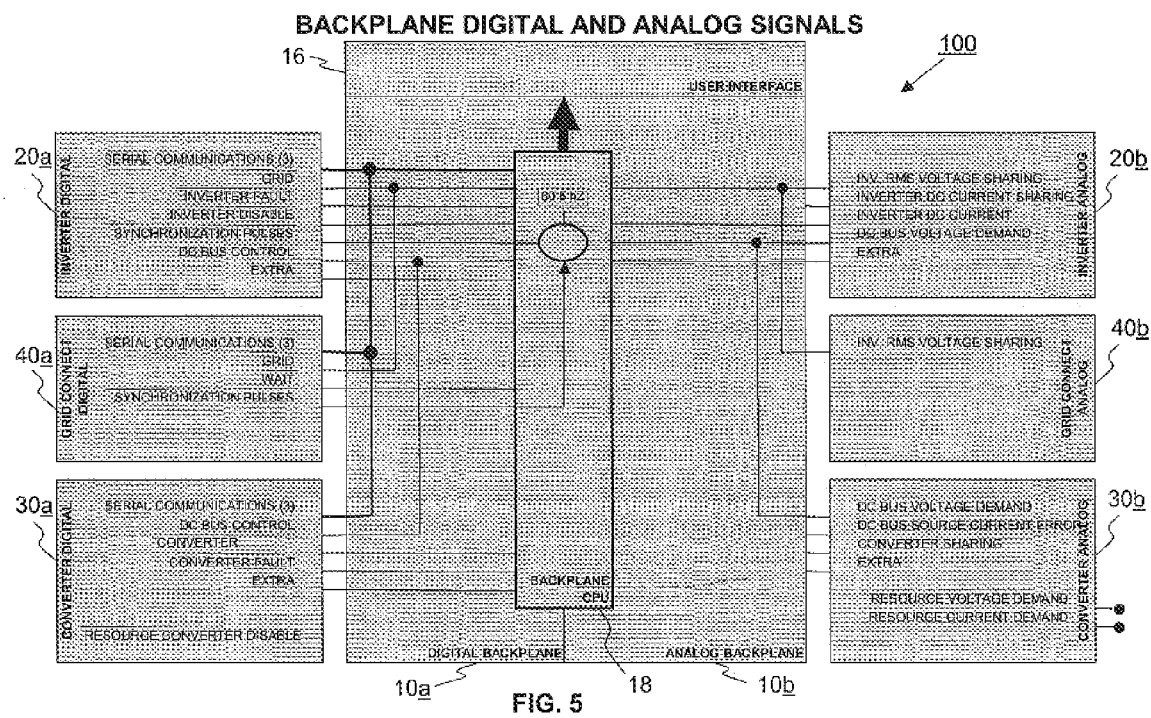
FIG. 5 is a block diagram illustrating the digital and analog control signals between the modules and the backplane for the power conversion and energy management system of FIG. 1.

FIG. 5 is a block diagram summarizing the digital and analog control signals for the system 100. These signals have been described previously with reference to FIGS. 2–4. FIG. 5 also further illustrates preferred components of the backplane 10. Referring to FIG. 5, the backplane 10 preferably includes both analog and digital circuitry. For convenience, the digital circuits are represented functionally by the digital backplane block 10a. Similarly, the analog circuits are represented functionally by the analog backplane block 10b. The digital backplane 10a communicates digital signals with the digital components of the inverter, converter, and grid connect modules 20a, 30a, 40a, respectively. Similarly, the analog backplane 10b communicates analog signals with the analog components of the inverter, converter, and grid connect modules 20b, 30b, 40b.

The backplane 10 further preferably includes a central processing unit (CPU) 18 and a user interface 16. The user interface 16 preferably allows a user to view the status of the system 100 and control system operation. The CPU 18 preferably communicates with the user interface 16 and processes the digital signals from the modules to control the operation of the backplane 10.

Having described and illustrated the principles of the invention with respect to preferred embodiments thereof, it should be apparent that the embodiments of this invention can be modified in arrangement and detail without departing from such principles. We therefore claim all modifications and variations coming within the spirit and scope of the following claims.

What is claimed is:

1. A power conversion and energy management system comprising:
    a backplane; and
    at least one power module configured to perform a power function, the at least one power module having a memory that stores information about the at least one power module, the at least one power module configured to be polled by the system to identify the at least one power module and convey information to the backplane.

2. A system according to claim 1, wherein the backplane comprises:
    at least one communication module; and
    a controller configurable to permit use of the system for a selected application.

3. A system according to claim 2, wherein the controller is configured to receive the at least one power module and the at least one communication module.

4. A system according to claim 3, wherein the controller is configured to use the at least one power module to control power quality and/or flow to one or more input and/or output connections.

5. A system according to claim 2, wherein the controller comprises:
    controller software;
    a control circuit;
    a power circuit;
    a protection circuit;
    an external electrical connection;
    an interface with the at least one; communication module; and
    an interface with the at least one power module.

6. A system according to claim 5, wherein the the at least one communication module is integrated with the controller.

7. A system according to claim 1, wherein the at least one power module comprises:
    one or more power circuits; and
    a driver circuit configured to receive control signals from an external source.

8. A system according to claim 1, wherein the backplane is configured to accommodate the at least one power module.

9. A system according to claim 8, wherein the backplane comprises non-power circuit components for operating the system.

10. A system according to claim 9, wherein the non-power circuit components comprise:
    external connectors;
    disconnects; and
    fusing.

11. A system according to claim 9, wherein the non-power circuit components comprise an internal DC bus and an internal AC bus to interconnect the at least one power module with another power module.

12. A system according to claim 1, wherein the backplane further comprises:
    a user interface;
    a supervisory controller;
    a socket for control firmware; and
    an appropriate number of slots for accommodating the at least one power module.

13. A system according to claim 12, wherein control firmware provides the ability to customize the backplane for a given application.

14. An energy management system comprising:
    a plurality of standard modules; and
    a backplane comprising a user interface, a controller, a communications module and
    an appropriate number of slots for accommodating the standard modules.

15. A system according to claim 14, wherein the backplane further comprises a socket for control firmware, wherein the control firmware provides the ability to customize the backplane.

16. A system according to claim 14, wherein the standard modules each comprise a memory configured to communicate information about that module to the controller.

17. A fuel cell power conversion and energy management system comprising:
    a backplane integrated with a fuel cell via an external DC plug connector, said backplane comprising a controller and a plurality of module slots configured to accommodate modules; and
    a plurality of modules connected to the module slots.

18. A system according to claim 17, wherein the plurality of modules comprise:
    a converter module;
    an inverter module; and
    a grid-connect module configured to determine when the fuel cell power conversion and energy management system should be connected to a power grid.

* * * * *

UNITED STATES PATENT AND TRADEMARK OFFICE
CERTIFICATE OF CORRECTION

PATENT NO. : 6,738,692 B2
DATED : May 18, 2004
INVENTOR(S) : Schienbein et al.

It is certified that error appears in the above-identified patent and that said Letters Patent is hereby corrected as shown below:

Title page,
Item [56], References Cited, FOREIGN PATENT DOCUMENTS,
"EP    0780750 A2    6/1998" should read -- EP    0780750 A2    6/1997 --.

Column 6,
Line 57, "DC BUS CONTROL signal," should read -- DC $_{BUS\ CONTROL}$ signal, --.

Column 7,
Line 66, "+48VDC imposed" should read -- +48$_{VDC}$ imposed --.
Line 67, "DC BUS CONTROL signal" should read -- DC $_{BUS\ CONTROL}$ signal, --.

Column 8,
Line 18, "+48VDC. When" should read -- +48$_{VDC.}$ When --.

Column 9,
Line 10, "Otherwise, 48 VDC is" should read -- Otherwise, 48 $_{VDC}$is --.
Line 19, "DC BUS CONTROL signal" should read -- DC $_{BUS\ CONTROL}$ signal, --.

Column 10,
Line 4, "analog DEMAND signal." should read -- analog $_{DEMAND}$ signal. --.
Line 60, "120/240 VAC output" should read -- 120/240$_{VAC}$ output --.

Column 11,
Line 60, "one; communication" should read -- one communication --.

Signed and Sealed this

First Day of February, 2005

JON W. DUDAS
*Director of the United States Patent and Trademark Office*